(12) United States Patent
Luft et al.

(10) Patent No.: US 8,849,548 B2
(45) Date of Patent: Sep. 30, 2014

(54) ANTI-STICKING AND DIAGNOSTIC STRATEGY FOR EXHAUST SYSTEM VALVES

(75) Inventors: Aaron Conrad Luft, Frankfort, IN (US); Daniel Streutker, Lafayette, IN (US); Rammohan Sankar, Dunlap, IL (US); Travis Eugene Barnes, Metamora, IL (US); Gregory L. Armstrong, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 326 days.

(21) Appl. No.: 13/300,941

(22) Filed: Nov. 21, 2011

(65) Prior Publication Data

US 2013/0131953 A1 May 23, 2013

(51) Int. Cl.
*F02D 41/22* (2006.01)
*F02B 37/24* (2006.01)
*F02B 39/16* (2006.01)
*F02B 37/18* (2006.01)
*F02B 37/00* (2006.01)
*F02B 37/007* (2006.01)

(52) U.S. Cl.
CPC ............. *F02B 37/18* (2013.01); *F02B 37/001* (2013.01); *F02B 39/16* (2013.01); *F02B 37/007* (2013.01); *Y02T 10/144* (2013.01)
USPC ..... 701/107; 701/108; 123/568.16; 123/559.1

(58) Field of Classification Search
USPC ............... 123/559.1, 568.11, 198 D, 568.16; 701/107, 108; 60/602, 605.1; 73/114.69, 114.76
See application file for complete search history.

(56) References Cited

U.S. PATENT DOCUMENTS

| | | | | |
|---|---|---|---|---|
| 7,500,363 | B2 * | 3/2009 | Hara et al. | 60/611 |
| 7,593,828 | B2 * | 9/2009 | Wang et al. | 702/138 |
| 7,775,043 | B2 | 8/2010 | Funke et al. | |
| 8,347,625 | B2 * | 1/2013 | Baeuerle | 60/602 |
| 2002/0144674 | A1 | 10/2002 | Wang et al. | |
| 2006/0272625 | A1 | 12/2006 | Wang | |
| 2009/0164106 | A1 | 6/2009 | Enomoto | |
| 2009/0211248 | A1 | 8/2009 | Andreae et al. | |
| 2012/0210710 | A1 * | 8/2012 | Chevalier et al. | 60/602 |

FOREIGN PATENT DOCUMENTS

| | | |
|---|---|---|
| EP | 2221464 | 8/2010 |
| EP | 2322780 | 5/2011 |
| JP | 57062954 | 4/1982 |
| JP | 2002070655 | 3/2002 |
| JP | 200838636 | 2/2008 |
| JP | 2011132948 | 7/2011 |

* cited by examiner

*Primary Examiner* — Hai Huynh
(74) *Attorney, Agent, or Firm* — Liell & McNeil

(57) ABSTRACT

An engine system includes an exhaust system fluidly connected to an electronically controlled engine. Exhaust from the engine may travel a first pathway through a turbine of a turbocharger, or a second pathway that bypasses the turbine. An electronically controlled wastegate vale is biased to close the second pathway. An electronic controller is in communication with the electronically controlled engine and the electronically controlled wastegate valve. The electronic controller is configured to execute a wastegate diagnostic algorithm to detect a stuck closed default condition of the electronically controlled wastegate valve, and derate the engine in response to detection of a stuck closed fault condition.

18 Claims, 2 Drawing Sheets

ANTI-STICKING AND DIAGNOSTIC STRATEGY FOR EXHAUST SYSTEM VALVES

TECHNICAL FIELD

The present disclosure relates generally to engine systems with electronically controlled valves located in the exhaust system, and more particularly to proactive diagnostics to detect and avoid stuck closed valve fault conditions.

BACKGROUND

Today's engine systems are often equipped with one or more turbochargers, an exhaust gas circulation system and electronically controlled valves in the exhaust system to control compressor bypass pathways, turbine bypass pathways, mass flow rate of exhaust gas recirculated and other known control features. An exhaust pathway that avoids the turbine is often controlled by what is termed in the art as a wastegate valve. For instance, when boost pressure approaches some predetermined maximum or there is a risk of turbine overspeed, the wastegate valve may be opened to channel exhaust directly from the exhaust manifold toward the tailpipe, without imparting energy to the turbocharger. Due to varying temperatures and the constituents in the engine exhaust, these valves can accumulate a build-up of hydrocarbons, soot and other compounds that inhibit proper operation to the extent that the valve can sometimes be stuck closed. In an effort to prevent valves located in the exhaust system from becoming stuck closed, the art recognizes various strategies for exercising the valve to inhibit sticking. For instance, U.S. Patent Publication 2009/0164106 teaches opening and closing an EGR valve when the engine ignition is on but the engine is not running in order to inhibit sticking after the engine begins operation. While maybe not true for all valves, such as valves controlling exhaust gas recirculation, a stuck closed wastegate valve can potentially lead to catastrophic turbocharger or engine failure.

The present disclosure is directed toward one or more of the problems set forth above.

SUMMARY

In one aspect, an engine system includes an exhaust system fluidly connected to an electronically controlled engine. The exhaust system has a first pathway through a turbine of a turbocharger, and a second pathway that bypasses the turbine. An electronically controlled wastegate valve is biased to close the second pathway. At least one electronic controller is in communication with the electronically controlled engine and the electronically controlled wastegate valve. The electronic controller is configured to execute a wastegate diagnostic algorithm to detect a stuck closed fault condition of the electronically controlled wastegate valve, and derate the electronically controlled engine in response to detection of a stuck closed fault condition of the electronically controlled wastegate valve.

In another aspect, a method of operating an engine system includes detecting a stuck closed fault condition of an electronically controlled wastegate valve. The electronically controlled engine is derated responsive to detection of the stuck closed fault condition of the electronically controlled wastegate valve.

DETAILED DESCRIPTION

Figure 1:
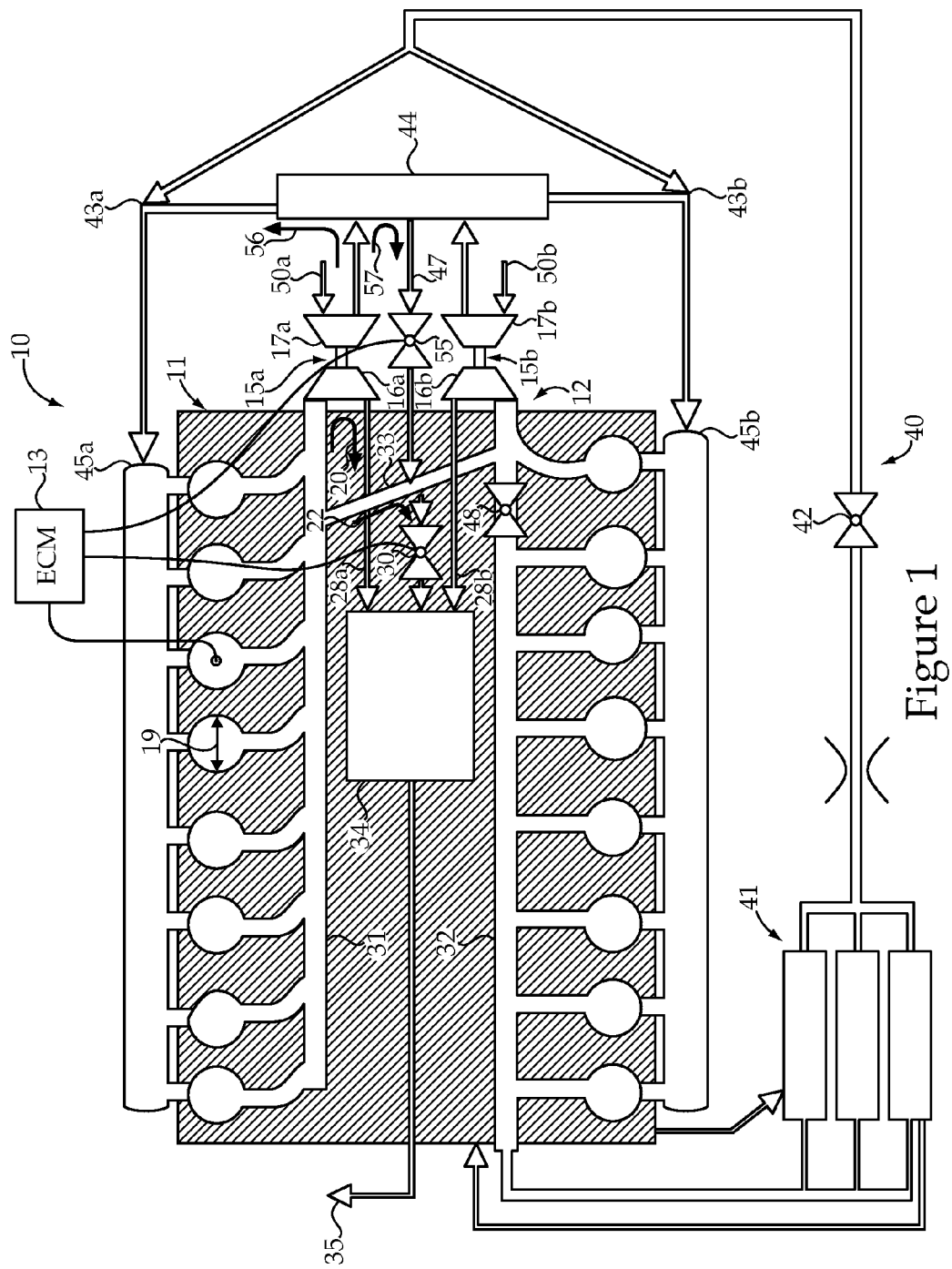
FIG. 1 is a schematic view of an engine system according to one aspect of the present disclosure.

Referring to FIG. 1, one example engine system 10 according to the present disclosure is shown. Engine system 10 includes an electronically controlled engine 11 that is fluidly connected to an exhaust system 12. In the illustrated embodiment, engine 11 is a sixteen cylinder large bore compression ignition engine whose operation is controlled by an electronic controller 13. One aspect of engine control being operation of electronically controlled fuel injectors (not shown) associated with each of the individual large bore cylinders 19, which may have a bore size in excess of 140 millimeters each. Also, in the illustrated embodiment, electronically controlled engine 11 has a V configuration with two separate banks of eight engine cylinders. Thus, Engine 11 has a first exhaust manifold 31 and a second exhaust manifold 32 that can be considered portions of exhaust system 12 that terminates at a tailpipe 35. Although not required, a balance tube 33 may fluidly connect the two exhaust manifolds 31 and 32.

Engine system 10 may include a pair of turbochargers 15a and 15b that are associated with the respective exhaust manifolds 31 and 32. Thus, exhaust from manifold 31 passes through a turbine 16a of turbocharger 15a before being channeled in a turbine exhaust 28a through an aftertreatment system, which may include a diesel particulate filter 34, before arriving at tailpipe 35. Likewise, exhaust from second manifold 32, and maybe additional exhaust from manifold 31 through balance tube 33, passes through a turbine 16b of turbocharger 15b before being channeled to an exhaust aftertreatment system by turbine exhaust 28b. Turbochargers 15a and 15b also include compressors 17a and 17b that receive incoming ambient air 50a and 50b and pressurize the same before channeling the compressed air to aftercooler 44. Output air from the aftercooler 44 may be mixed with recirculated exhaust gas at mixers 43a and 43b before being channeled to respective intake manifolds 45a and 45b. In the illustrated embodiment, exhaust gas recirculation is provided by seven cylinders in the exhaust manifold 32, and the rate of exhaust gas circulation is partially controlled by an exhaust restriction valve 48 in a known manner. The recirculated exhaust gas may be cooled at coolers 41 before passing through an EGR cold valve 42 on the way to mixers 43a and 43b.

Apart from controlling Engine 11, electronic controller 13 is also in control communication with an electronically controlled wastegate valve 30 and an electronically controlled compress bypass valve 55. Electronically controlled wastegate valve 30 may be biased to a closed position but open in response to an open signal transmitted from electronic controller 13. Thus electronically controlled wastegate valve 30 is normally biased closed, but may be opened by any suitable actuator, including but not limited to electrical actuators, pneumatic actuators, and hydraulic actuators. When closed, exhaust travels a first pathway 20 through turbine 16. When wastegate valve 30 is open, exhaust travels a second pathway 22 directly from balance tube 33 to the exhaust aftertreatment system that is represented by diesel particulate filter 34. For instance, wastegate valve 30 might be opened to avoid a turbine overspeed condition, to reduce boost pressure or any other reason known in the art. Because electronically controlled wastegate valve 30 is normally closed, and continuously exposed to hydrocarbon build-up, there is a risk that the build-up can cause the valve to be stuck in a closed position. Electronically controlled wastegate valve 30 may utilize any known actuator to move from a closed position to an open position, and any known sensor for communicating valve condition to electronic controller 13 in a known manner. The valve condition sensor may be as simple as one bit of information relating to open or closed, or may have any desired granularity to also detect partially opened valve conditions without departing from the present disclosure. All versions of the present disclosure include one or more electronically controlled wastegate valves that allow exhaust to be channeled through a second pathway 22 that avoids a turbocharger(s) 15. Thus, the present disclosure contemplates an engine system with any number of turbochargers with or without exhaust gas recirculation and any number of electronically controlled wastegate and/or bypass valves that permit the exhaust or air to bypass one or more of the turbochargers and/or engine, respectively.

The compress bypass valve 55 allows the electronic controller 13 to directly fluidly connect aftercooler 44 to balance tube 33 via a bypass passageway 47. Thus, air from aftercooler 44 may be directed along a first pathway 56 through compressor 17, through aftercooler 44 and into engine 11 via a respective intake manifold 45. When electronically controlled compress bypass valve 55 is open, a second pathway 57 fluidly connects aftercooler 44 directly to balance tube 33 to bypass engine 11. Like wastegate valve 30, compress bypass valve 55 is normally closed, and thus is also exposed to hydrocarbon build up on the downstream side of the valve where it connects to balance tube 33. Electronically controlled compress bypass valve 55 may include any suitable actuator for opening the valve from a normally closed position to an open position, and may include a valve condition sensor that communicates the valve position to electronic controller 13 with any desired level of granularity, ranging from a simple open or closed indicator to a sensor that actually senses a continuum of different valve positions.

Figure 2:
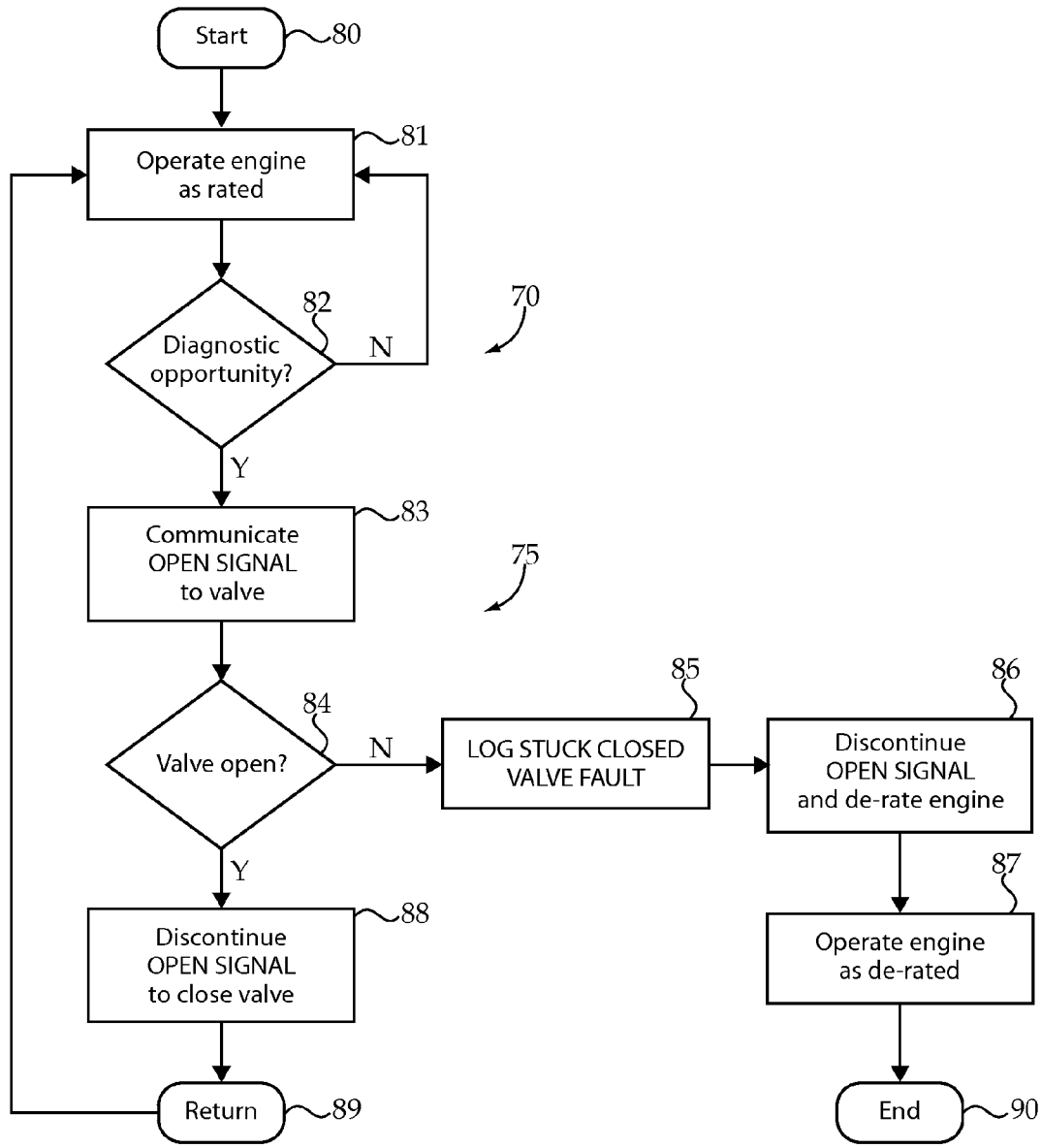
FIG. 2 is a software flow diagram for carrying out the logic of detecting and logging a stuck closed valve condition according to the present disclosure.

Referring to FIG. 2, a flow diagram illustrates a small fraction of the software executed by electronic controller 13 when engine system 10 is in operation. After start box 80, the engine system 10 is operated as rated at box 81. When operated in a rated condition, engine system 10 has its full rated maximum power available. Electronic controller 13 may be configured to execute a diagnostic opportunity detection algorithm 70 by executing a query 82 to determine whether a diagnostic opportunity is available. In general, according to the present disclosure a diagnostic opportunity means that the engine is operating in a condition where the exhaust valve (e.g., wastegate valve 30 or compress bypass valve 55) is normally closed, and there is no need for boost pressure or opening the exhaust valve will not significantly degrade from a desired boost level. For instance, a diagnostic opportunity could be during low idle conditions when there is no need for boost. Another diagnostic opportunity according to the present disclosure could be when electronic controller is commanding zero fueling, such as when a machine equipped with engine system 10 is coasting downhill. Another diagnostic opportunity might be when electronic controller 13 requests a large deceleration of engine 11, such as a deceleration change of maybe 500 RPM. In such a case, the open signal may be transmitted to the exhaust valve 33, 55 while the engine is decelerating, and may actually assist in the deceleration. Other less desirable diagnostic opportunities might occur during low boost levels combined with low fueling levels such that opening one or both of the exhaust valve 33 and 55 will not significantly degrade from a desired boost level. Those skilled in the art will appreciate that the diagnostic opportunity query 82 is only executed when engine system 10 is running, the valve to be diagnosed is in its normally closed position and the other opportunity conditions discussed above are met. If query 82 returns a negative, the software will loop back and continue to operate engine system 10 in a rated condition. If the diagnostic opportunity query returns a yes, electronic controller 13 will execute a valve diagnostic algorithm 75 with respect to each exhaust valve. For instance, electronic controller may execute valve diagnostic algorithm 75 for each of the exhaust valves in question in series, or in parallel without departing from the present disclosure. At box 83, an open signal is communicated from electronic controller 13 to the valve in question, such as wastegate valve 30 or compress bypass valve 55. At query 84, electronic controller 13 reads the valve condition sensor and determines whether the valve is indeed open. If the query 84 returns yes, the open signal to the valve is discontinued at box 88, and at box 89 the software loops back to continue engine operation as rated at box 81. If the valve opening query 84 returns a no, electronic controller 13 logs a stuck closed valve fault in memory at box 86, the open signal is discontinued and the engine is derated. At box 87, the engine is operated as derated and the logic flow diagram ends at box 90. As used in the present disclosure, the term derated means that engine system 10 is allowed to operate at any condition that does not require the valve in question to open, which typically is less than its rated maximum power, until the stuck closed valve condition is remedied. In other words a derated engine according to the present disclosure means that engine system 10 operation will be prevented from entering a range where the electronic controller 13 would command the valve in question to open, which typically occurs at higher speed and load conditions for engine 11. Thus, the engine may continue to operate at full power after a fault is detected, but will reduce available power when there is a need to open the valve in question to avoid engine and/or turbocharger damage. When implemented, the valve diagnostic algorithm 75 may be executed sequentially for the electronically controlled wastegate valve 30 followed by the electronically controlled compress bypass valve 55. Either valve being found in a stuck closed position can cause the engine to be derated until the valve stuck closed default condition is remedied in a known manner. However, the derated range of available operation of engine 11 may be different depending on which valve is stuck closed. In some instances, continued operation of the engine may relieve the stuck closed valve condition without any outside intervention. Otherwise, servicing by a technician may be necessary in order to remedy the stuck closed valve condition and reset the fault condition to return the engine to rated operation.

INDUSTRIAL APPLICABILITY

The present disclosure finds potential application in any engine system (e.g. compression ignition, spark ignition, etc.) that includes one or more electronically controlled exhaust valves that are normally closed and may become stuck closed due to the build up of hydrocarbons, soot and other compounds in the exhaust. The present disclosure finds specific application in large bore compression ignition engines where opening of the exhaust valve may be necessary during certain engine operating conditions in order to avoid risks associated with catastrophic turbocharger or engine failure. The present disclosure finds potential application in any engine system that includes an exhaust valve that may become stuck closed and the engine system has any of a wide variety of system configurations that may or may not include exhaust gas recirculation, and may or may not include one or more turbochargers in series or parallel, etc. In all versions of the present disclosure the exhaust valve in question is electrically controlled to move to an open position, and includes some sensor or other means (e.g. inferred from other sensors) for communicating the valve condition to the electronic controller for execution of the valve diagnostic algorithm according to the present disclosure.

The present disclosure advantageously utilizes a valve diagnostic algorithm to detect a stuck closed valve condition before there is a need to open the valve in question. While this is important, the diagnostic activity may proactively inhibit sticking problems by exercising the valve to open when to do so would not undermine current engine operation conditions, such as significantly effecting boost pressure. Thus, depending upon the particular application, engineers may be more or less aggressive in deciding what constitutes a diagnostic opportunity according to the present disclosure. In those applications where build up may occur more rapidly and a stuck closed valve condition may be more likely to occur, the software might be implemented to look for as many diagnostic opportunities as possible to exercise the valve between open and closed positions more often than in instances where valve closed stuck conditions are extremely rare. For instance, one application might only choose to encode a diagnostic opportunity as corresponding to electronic controller 13 requesting a deceleration of engine 11 greater than some determined RPM, such as 500 RPM. In other instances, the diagnostic opportunity algorithm may be encoded to execute the valve diagnostic algorithm in regular intervals during idle conditions, when a large engine deceleration is requested, when zero fueling is requested and look for other opportunities such as low boost and low fueling conditions to exercise the exhaust valves, especially if a counter has determined that the valves have been closed for some extended duration. For instance, if electronic controller 13 is programmed to keep track of time past since the last time the respective exhaust valve was open, the diagnostic opportunity algorithm may include programming to expand opportunities to low boost and low fueling conditions to help proactively ensure that the valve does not become stuck closed. Thus, during normal operation, if the diagnostic opportunity algorithm 70 provides enough opportunities to execute the valve diagnostic algorithm 75, the valve should be regularly exercised so that hydrocarbon, soot and other compound build up never reaches a point where the valve becomes stuck closed and a fault condition is actually detected and acted upon to derate engine system 10. When the valve diagnostic algorithm 75 is acting upon wastegate valve 30, that logic may be considered as a wastegate diagnostic algorithm according to the present disclosure. In addition, when the valve diagnostic algorithm 75 is acting upon the compress bypass valve 55, the algorithm may be characterized as a compress bypass valve diagnostic algorithm without departing from the present disclosure.

Although the present disclosure has been illustrated in the context of valves that are biased toward a closed position, the present disclosure also contemplates systems in which the valves are biased to a partially or fully open position such that the valve must be actuated to be moved to a closed position. In such a case, during normal operation when the valve is normally closed, the actuator for the respective valve would be actuated to maintain the same closed until the controller determined that the valve was in need of being opened. As used in the present disclosure, "communicating an open signal" to a valve that is biased to an open or partially opened position means discontinuing a signal that actuates the valve to a closed position. Likewise, the phrase "discontinuing an open signal" to a valve that is biased to an open or partially open position means communicating a signal to the valve actuator to cause the valve to close. Thus, valves that need no actuation energy in order to open would also fall within the present disclosure.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. An engine system comprising:
   an electronically controlled engine;
   an exhaust system fluidly connected to the engine having first pathway through a turbine of a turbocharger, and a second pathway that bypasses the turbine, and including an electronically controlled wastegate valve to close the second pathway;
   at least one electronic controller in communication with the electronically controlled engine and the electronically controlled wastegate valve, the at least one electronic controller configured to execute a wastegate diagnostic algorithm to detect a stuck closed fault condition of the electronically controlled wastegate valve and derate the electronically controlled engine in response to a detection of the stuck closed fault condition of the electronically controlled wastegate valve; and
   wherein the at least one electronic controller is further configured to execute a diagnostic opportunity detection algorithm to detect a diagnostic opportunity window, and to execute the wastegate diagnostic algorithm in response to a detection of the diagnostic opportunity window.

2. The engine system of claim 1 wherein the wastegate diagnostic algorithm is configured to:
   communicate an open signal to the electronically controlled wastegate valve;
   receive a wastegate configuration signal while communicating the open signal; and
   either log a stuck closed fault condition of the electronically controlled wastegate valve in response to the wastegate configuration signal indicating a closed wastegate condition, or to discontinue the open signal in response to the wastegate configuration signal indicating an open wastegate condition.

3. The engine system of claim 2 wherein the diagnostic opportunity window corresponds to a requested engine deceleration greater than a predetermined RPM.

4. The engine system of claim 3 wherein the electronically controlled engine has a bore size greater than one hundred forty millimeters.

5. An engine system comprising:
   an electronically controlled engine;
   an exhaust system fluidly connected to the engine having first pathway through a turbine of a turbocharger, and a second pathway that bypasses the turbine, and including an electronically controlled wastegate valve to close the second pathway;
   at least one electronic controller in communication with the electronically controlled engine and the electronically controlled wastegate valve, the at least one electronic controller configured to execute a wastegate diagnostic algorithm to detect a stuck closed fault condition of the electronically controlled wastegate valve and derate the electronically controlled engine in response to a detection of the stuck closed fault condition of the electronically controlled wastegate valve;

an intake system with a first pathway through a compressor of the turbocharger and into the engine; a second pathway that bypasses the engine into the exhaust system; and including an electronically controlled compress bypass valve to close the second pathway; and the at least one electronic controller being in communication with the electronically controlled compress bypass valve, the at least one electronic controller configured to execute a compress bypass diagnostic algorithm configured to detect a stuck closed fault condition of the electronically controlled compress bypass valve, and to derate the electronically controlled engine responsive to detection of the stuck closed fault condition of the electronically controlled compress bypass valve.

6. The engine system of claim 5 wherein the at least one electronic controller is further configured to execute a diagnostic opportunity detection algorithm to detect a diagnostic opportunity window, and to execute the wastegate diagnostic algorithm and the compress bypass diagnostic algorithm in response to a detection of the diagnostic opportunity window; and the diagnostic opportunity window corresponding to an engine operation condition corresponding to a normally closed wastegate valve and normally closed compress bypass valve.

7. The engine system of claim 6 wherein the wastegate diagnostic algorithm is configured to:

communicate an open signal to the electronically controlled wastegate valve;

receive a wastegate configuration signal while communicating the open signal; and either log a stuck closed fault condition of the electronically controlled wastegate valve in response to the wastegate configuration signal indicating a closed wastegate condition, or discontinue the open signal in response to the wastegate configuration signal indicating an open wastegate condition, and wherein the compress bypass diagnostic algorithm is configured to:

communicate an open signal to the electronically controlled compress bypass valve;

receive a compress bypass configuration signal while communicating the open signal; and either log a stuck closed fault condition of the electronically controlled compress bypass valve in response to the compress bypass configuration signal indicating a closed compress bypass condition, or discontinue the open signal in response to the compress bypass configuration signal indicating an open compress bypass condition.

8. The engine system of claim 7 wherein the diagnostic opportunity window corresponds to a requested engine deceleration greater than a predetermined RPM.

9. The engine system of claim 8 wherein the electronically controlled engine has a bore size greater than one hundred forty millimeters.

10. A method of operating an engine system that includes an electronically controlled engine; an exhaust system fluidly connected to the engine having a first pathway through a turbine of a turbocharger, and a second pathway that bypasses the turbine, and including an electronically controlled wastegate valve to close the second pathway; and at least one electronic controller in control communication with the electronically controlled engine and the electronically controlled wastegate valve, and the method comprising the steps of:

detecting a stuck closed fault condition of the electronically controlled wastegate valve;

derating the electronically controlled engine responsive to detection of the stuck closed fault condition of the electronically controlled wastegate valve;

detecting a diagnostic opportunity window;

executing a wastegate diagnostic algorithm responsive to detection of the diagnostic opportunity window;

the step of detecting a stuck closed fault condition is performed responsive to executing the wastegate diagnostic algorithm; and the diagnostic opportunity window corresponding to an engine operation condition corresponding to a normally closed wastegate valve and normally closed compress bypass valve.

11. The method of claim 10 wherein executing the wastegate diagnostic algorithm includes:

communicating an open signal to the electronically controlled wastegate valve;

receiving a wastegate configuration signal while communicating the open signal; and logging a stuck closed fault condition of the electronically controlled wastegate valve responsive to the wastegate configuration signal indicating a closed wastegate condition, or discontinuing the open signal responsive to the wastegate configuration signal indicating an open wastegate condition.

12. The method of claim 11 wherein the step of detecting the diagnostic opportunity window includes detection of a decrease in desired engine speed greater than a predetermined RPM.

13. The method of claim 12 wherein the step of executing the wastegate diagnostic algorithm is performed while the electronically controlled engine is decelerating.

14. The method of claim 10 wherein the engine system includes an intake system with a first pathway through a compressor of the turbocharger and into the engine, a second pathway that bypasses the engine into the exhaust system, and including an electronically controlled compress bypass valve to close the second pathway, and the at least one electronic controller being in control communication with the electronically controlled compress bypass valve; and the method including the steps of:

detecting a stuck closed fault condition of the electronically controlled compress bypass valve; and derating the electronically controlled engine responsive to detection of the stuck closed fault condition of the electronically controlled compress bypass valve.

15. The method of claim 14 including detecting a diagnostic opportunity window;

executing a compress bypass diagnostic algorithm and a wastegate diagnostic algorithm responsive to detection of the diagnostic opportunity window;

the step of detecting a stuck closed fault condition of the compress bypass valve is performed responsive to executing the compress bypass diagnostic algorithm;

the step of detecting a stuck closed fault condition of the wastegate valve is performed responsive to executing the wastegate diagnostic algorithm; and the diagnostic opportunity window corresponding to an engine operation condition corresponding to a normally closed wastegate valve and normally closed compress bypass valve.

16. The method of claim 15 wherein executing the wastegate diagnostic algorithm includes:

communicating an open signal to the electronically controlled wastegate valve;

receiving a wastegate configuration signal while communicating the open signal to the electronically controlled wastegate valve; and logging a stuck closed fault condition of the electronically controlled wastegate valve responsive to the wastegate configuration signal indicating a closed wastegate condition, or discontinuing the open signal responsive to the wastegate configuration signal indicating an open wastegate condition; and executing the compress bypass diagnostic algorithm includes:

communicating an open signal to the electronically controlled compress bypass valve;

receiving a compress bypass configuration signal while communicating the open signal to the electronically controlled compress bypass valve; and logging a stuck closed fault condition of the electronically controlled compress bypass valve responsive to the compress bypass configuration signal indicating a closed compress bypass condition, or discontinuing the open signal to the electronically controlled compress bypass valve responsive to the compress bypass configuration signal indicating an open compress bypass condition.

17. The method of claim 16 wherein the step of detecting the diagnostic opportunity window includes detection of a decrease in desired engine speed greater than a predetermined RPM.

18. The method of claim 17 wherein the step of executing the wastegate diagnostic algorithm and executing the compress bypass diagnostic algorithm is performed while the electronically controlled engine is decelerating.

* * * * *